(12) United States Patent
Bartling et al.

(10) Patent No.: US 7,405,014 B2
(45) Date of Patent: Jul. 29, 2008

(54) TAB SYSTEM FOR A METAL-AIR ELECTROCHEMICAL CELL

(75) Inventors: Brandon A. Bartling, Avon Lake, OH (US); Timothy D. Foley, Wellington, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 469 days.

(21) Appl. No.: 10/743,585

(22) Filed: Dec. 22, 2003

(65) Prior Publication Data

US 2005/0136322 A1    Jun. 23, 2005

(51) Int. Cl.
*H01M 2/08* (2006.01)
*H01M 2/12* (2006.01)
*H01M 12/06* (2006.01)

(52) U.S. Cl. .......................................... 429/27; 429/82
(58) Field of Classification Search .................. 429/27, 429/82, 229
See application file for complete search history.

(56) References Cited

U.S. PATENT DOCUMENTS

| | | | |
|---|---|---|---|
| 2,597,116 A | 5/1952 | Marsal et al. | 136/136 |
| 2,632,032 A | 3/1953 | Winckler | 136/133 |
| 2,751,428 A | 6/1956 | Depoix | 136/111 |
| 3,489,616 A | 1/1970 | Fangradt et al. | 136/107 |
| 4,649,090 A | 3/1987 | Oltman et al. | 429/29 |
| 5,328,778 A * | 7/1994 | Woodruff et al. | 429/27 |
| 5,839,583 A | 11/1998 | Pope et al. | 206/704 |
| 6,265,102 B1 * | 7/2001 | Shrim et al. | 429/172 |
| 6,329,095 B1 | 12/2001 | Farnworth et al. | 429/48 |
| 6,581,799 B1 | 6/2003 | Garrant et al. | 221/88 |

FOREIGN PATENT DOCUMENTS

| | | |
|---|---|---|
| EP | 0230039 | 7/1987 |
| EP | 0771044 | 5/1997 |
| EP | 0875954 | 11/1998 |
| JP | 55-043765 | 3/1980 |
| JP | 56-041673 | 4/1981 |
| JP | 56-048077 | 5/1981 |
| JP | 57-158966 | 9/1982 |
| JP | 58-087780 | 5/1983 |
| JP | 58161246 A | 9/1983 |
| JP | 58161273 A | 9/1983 |
| JP | 58164173 A | 9/1983 |
| JP | 58186173 A | 10/1983 |
| JP | 58206080 | 12/1983 |
| JP | 61-163572 | 7/1986 |
| JP | 62202468 A | 9/1987 |
| JP | 63224161 A | 9/1988 |
| JP | 5-121057 | 5/1993 |
| WO | 9847191 | 10/1998 |
| WO | 0191224 | 11/2001 |
| WO | 0233774 | 4/2002 |

OTHER PUBLICATIONS

Linden "Handbook of Batteries" 2nd Ed., McGraw Hill, 1995, pp. 13.1-13.20.*

* cited by examiner

*Primary Examiner*—Gregg Cantelmo
(74) *Attorney, Agent, or Firm*—Russell H. Toye, Jr.

(57) ABSTRACT

Various embodiments of a metal-air cell having a tab system that covers an air entry port of the metal-air cell are provided. In one representative embodiment the tab system includes polymer layer and an adhesive layer between the metal-air cell and the polymer layer. The tab system has a loss stiffness of less than 55,000 N/m at 20° C. to 25° C.

32 Claims, 3 Drawing Sheets

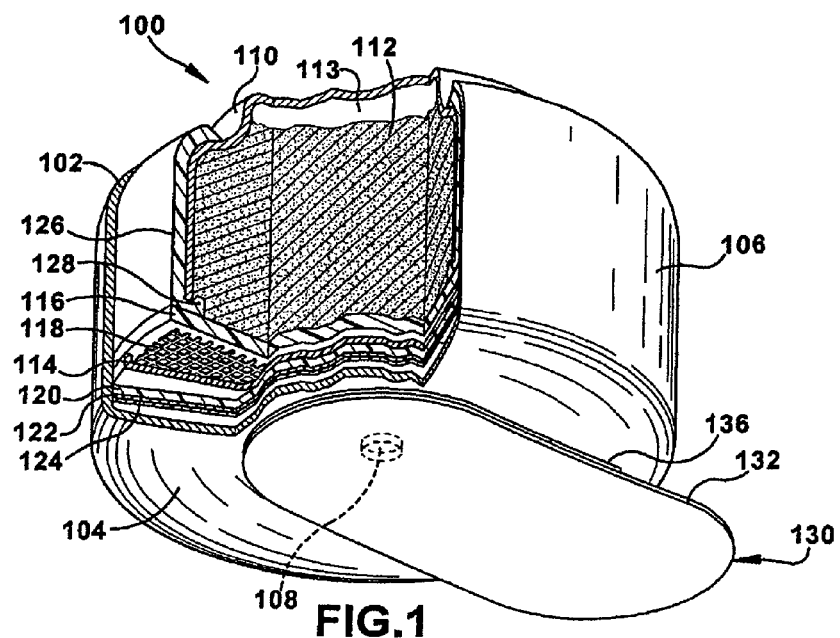
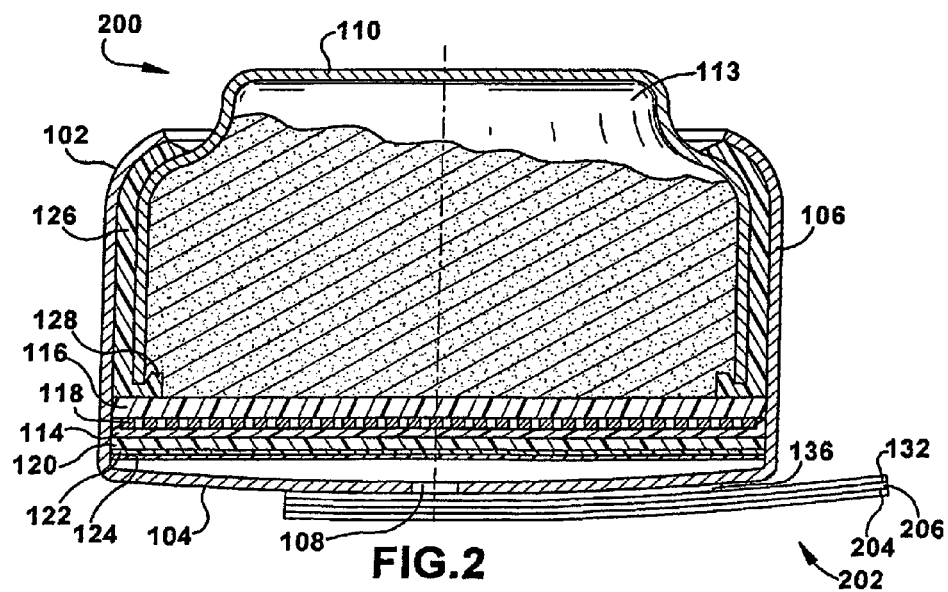

TAB SYSTEM FOR A METAL-AIR ELECTROCHEMICAL CELL

BACKGROUND

The present invention relates to a metal-air cell having a tab system that covers an air entry port of the metal-air cell prior to use.

Metal-air cells use oxygen directly from the atmosphere to produce electrochemical energy. A metal-air cell typically has a negative electrode, the anode, and contains an active material, such as zinc, and an electrolyte such as potassium hydroxide. The metal-air cell does not contain a consumable cathode material, as oxygen from the atmosphere is the active cathode material. For this reason, metal-air cells have a greater capacity for anode material relative to their size and they are used extensively in applications which require moderate drains and continuous discharge usage, such as in hearing aids. The diffusion of oxygen into the cell begins a series of chemical reactions that produce gases inside the cell and ultimately consume the anode material.

Metal-air cells typically have at least one air entry port for the ingress of oxygen into the cell and the egress of hydrogen out of the cell during operation. The air entry port is covered by a tab system prior to the use of the metal-air cell to prevent it from becoming prematurely activated. Conventional tab systems typically include at least one polymer film to control diffusion of oxygen into the air entry port of the metal-air cell and at least one adhesive to adhere the polymer film to the metal-air cell.

The tab system must have proper air permeation characteristics to provide the proper balance in the amount of oxygen that diffuses into the metal-air cell and the amount of gas that diffuses out of the cell. One problem associated with metal-air cells despite the presence of a tab system is the reduction in the shelf life and the useful discharge life of the metal-air cell. Some tab systems allow too much oxygen ingress which causes the open cell voltage (OCV) of the metal-air cell to be too great, consuming an excessive amount of active material. In other metal-air cells in which a tab system has low oxygen permeation, the OCV of the metal-air cell is too low upon removal of the tab system, which causes the user to believe that the metal-air cell is dead.

SUMMARY

The present invention provides for a metal-air cell having a tab system that covers at least one air entry port along an exterior surface of the metal-air cell. In one embodiment the tab system includes at least one polymer layer and an adhesive layer disposed between the cell and the polymer layer, and the tab system has a loss stiffness that is less than about 55,000 Newtons/meter (N/m) at 20° C. to 25° C.

In an alternative embodiment the metal-air cell has a tab system that includes a first polymer layer and layer of adhesive disposed between the metal-air cell and the first polymer layer. The tab system has a loss stiffness that is less than about 55,000 N/m at 20° C. to 25° C. and a burst pressure, at which the seal between the tab system and the metal-air cell is broken as a result of internal pressure in the cell, is at least about 43 pounds per square inch (psi).

In another alternative embodiment the metal-air cell has a tab system that includes a first polymer layer and layer of adhesive disposed between the metal-air cell and the first polymer layer. The tab system has a loss stiffness that is less than about 55,000 N/m at 20° C. to 25° C., a burst pressure of at least about 43 psi, and a peel strength that ranges from about 6.5 psi to about 11 psi.

In yet another alternative embodiment the metal-air cell has a tab system that includes a first polymer layer and a layer of adhesive disposed between the metal-air cell and the first polymer layer. The tab system has a loss stiffness that is less than about 55,000 N/m at 20° C. to 25° C., an average burst pressure of at least about 43 psi and a peel strength that ranges from about 6.5 psi to about 11 psi. The cell includes an active material comprising zinc and an electrolyte comprising potassium hydroxide, contains zero added mercury and has an open circuit voltage that ranges from about 1.18 to about 1.37 volts.

In some embodiments the tab system has a loss stiffness that is from about 25,000 N/m to about 45,000 N/m at 20° C. to about 25° C. and is less than about 35,000 N/m at 60° C. The tab system has improved conformability to the external surface of the metal-air cell and has been found to be more effective in preventing premature cell activation during storage. The tab system better controls oxygen ingress into the metal-air cell, and the oxygen permeability of the tab system can range from about 15 $(cm^3 \times m \times mm\ Hg)/(m^2 \times day)$ to about 150 $(cm^3 \times m \times mm\ Hg)/(m^2 \times day)$ so that the metal-air cell maintains an open circuit voltage (OCV) that ranges from about 1.18 to about 1.37 volts. In addition, the generation of gases through chemical reactions inside the metal-air cell are greater when the metal-air cell is assembled with zero added mercury, making control of gas transmission through the tab system more important. Thus, in another embodiment of the invention the metal-air cell contains zero added mercury.

As used herein, the term "about" means within experimental error in measurement and rounding, and averages are as determined from at least three individual values. The values of properties and characteristics disclosed herein are as determined by the disclosed test methods; equivalent methods, which will give comparable results, may be substituted.

BRIEF DESCRIPTION OF THE DRAWINGS

The invention can be understood with reference to the following drawings. The components in the drawings are not necessarily to scale. Also, in the drawings, like reference numerals designate corresponding parts throughout the views.

FIG. 1 is a perspective cut-away view of a metal-air cell with a tab system adhered thereto, according to an embodiment of the invention;

FIG. 2 is a cross-sectional view of a metal-air cell with a tab system according to an embodiment of the invention;

DETAILED DESCRIPTION

Figure 3:
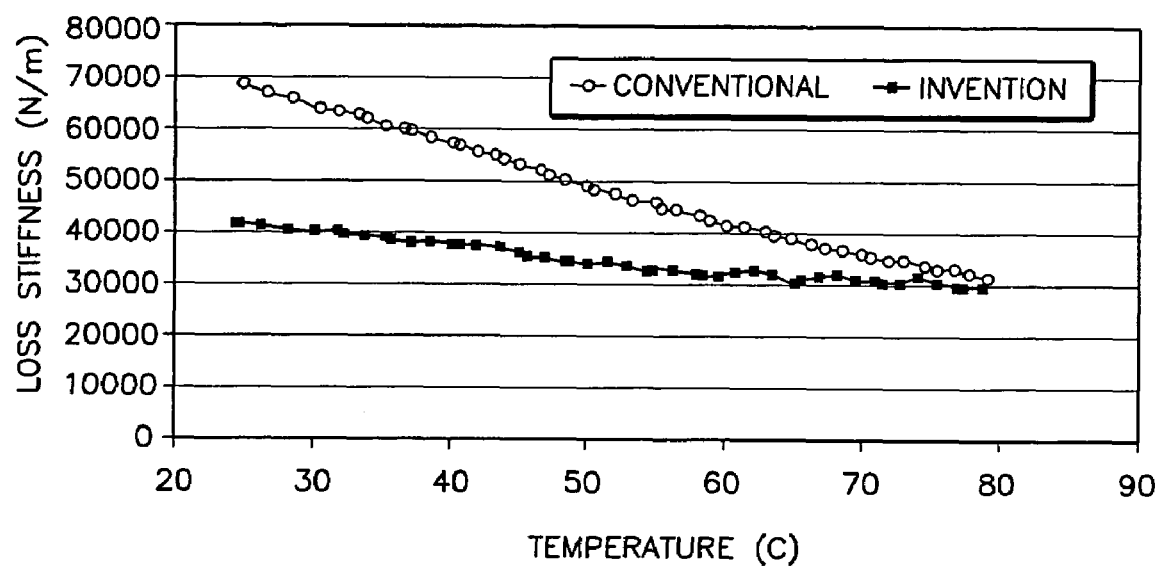
FIG. 3 is a graph comparing the loss stiffness of the tab system of FIG. 2 over a range of temperatures according to an embodiment of the invention.

FIG. 1 illustrates an example embodiment of the metal-air cell 100 according to the present invention. For purposes of convenience, example embodiments of the present invention are described with respect to a button-type metal-air cell 100 used in small appliances, such as a hearing aid. However, one skilled in the art can appreciate that embodiments of the present invention can also be described with respect to other metal-air cells, such as larger cylinder and prismatic cells.

The metal-air cell 100 is a button cell that includes a positive terminal, commonly known as the "cathode can" 102, having a surface 104, for example along the bottom of the cathode can, surrounded by a wall 106. The central portion of the surface 104 can be generally planar and the surrounding wall 106 can be of uniform height and can be substantially perpendicular to the bottom of can 102, although the shape, dimensions and angle of the wall can vary. At least one air entry port 108 is located along the surface 104 of cathode can 102. The metal-air cell 100 also includes an anode cup 110, made of metal. The anode cup 110 can be formed in the shape of a cup and is generally known as the "anode cup".

In a metal-air cell that is larger than a button-type metal-air cell, for example a cylindrical and a prismatic metal-air cell, the cathode can and anode cup can have different shapes.

In an alternative embodiment the can is the negative contact terminal and the cup is the positive terminal. In such case the one or more air entry port is located along the surface of the positive terminal, the cup 110, rather than the can.

The anode cup 110 and the cathode can 102 can be a single layer of metal, a bilaminate, or a multiple metal layer laminate. Typical metals that are used for the anode cup 110 and cathode can 102 include, for example, nickel, stainless steel and copper, for example. In one example embodiment anode cup 110 can be made of a tri-clad material that includes copper/stainless steel/nickel from the interior to the exterior of the anode cup 110 and cathode can 102 is made of nickel plated steel or nickel plated stainless steel. The surface of the metal-air cell through which one or more air entry port 108 is located, whether along the cathode can 102 or along the anode cup 110, can also be made of a non-conductive material so long as the metal-air cell has separate conductive contact terminals.

An anode mixture 112 is present within the interior of the metal-air cell 100 and several compositions of anode mixture 112 are possible and are well known to those of ordinary skill in the art. The anode mixture 112 typically includes a mixture of an active ingredient, for example, zinc powder, an alkaline electrolyte, for example potassium hydroxide or sodium hydroxide, and a gelling agent, for example an acrylic acid polymer. A gas inhibitor such as, for example, indium hydroxide ($In(OH)_3$) and other additives can be included to minimize gas generation. Examples of these additives include zinc oxide and polyethylene glycol. The compositions of suitable anode mixture compositions in metal-air cells containing zero added mercury are disclosed in U.S. Pat. No. 6,602,629, issued on Aug. 5, 2003, assigned to Eveready Battery Company, Inc., St. Louis, Mo., and which is hereby incorporated by reference herein. The amount of anode mixture 112 that is placed in the metal-air cell 100 can be less than the available volume and so an air pocket 113 can often be present.

The metal-air cell 100 further includes an air electrode 114 positioned below and electrically insulated from the anode mixture 112 by an ionically conductive separator 116. The air electrode 114 may be any material suitable for use as an air electrode and can include, but is not limited to, carbon, manganese oxide ($MnO_x$) and polytetrafluoroethylene (PTFE), for example. A metal screen 118, which can be a nickel screen coated with catalyst, can be embedded within the air electrode 114 to improve electrical conductivity of the air electrode 114 and provide good electrical contact between the air electrode 114 and the cathode can 102. A hydrophobic membrane 120 made of a polytetrafluoroethylene (PTFE) polymer, for example, can be laminated on the bottom side of the air electrode 114 facing the bottom of cathode can 102 to maintain a gas-permeable waterproof boundary between the air and electrolyte within metal-air cell 100. In addition, the metal-air cell can also include an air diffusion membrane 122 to regulate gas diffusion rates and an air distribution membrane 124 to distribute air evenly to the air electrode 114. An electrical insulator 126, which is generally known as "grommet" or "gasket" and is typically made of a flexible polymer, provides electrical insulation and serves as a seal between the anode cup 110 and the inner surface of cathode can 102. The edge of electrical insulator 126 can be formed to create an inwardly protruding lip 128 which abuts the rim of the anode cup 110.

Referring to FIG. 1, tab system 130 covers at least one air entry port, for example, air entry port 108 of cathode can 102 of metal-air cell 100. In one embodiment the tab system 130 includes at least one polymer layer 132 and an adhesive layer 136. Tab system 130 covers the air entry port 108 until the metal-air cell is ready for use. When it is desired to activate the metal-air cell 100, the user simply peels the tab system 130 away from the metal-air cell to expose the air entry port 108.

FIG. 2 is a cross-sectional view of metal-air cell 200 having a tab system 202 that covers air entry port 108 of cathode can 102, according to another example embodiment of the present invention. Tab system 202 can also cover a plurality of air entry ports (not Shown) of cathode can 102. Tab system 202 includes a polymer layer 132, a second polymer layer 204, and an adhesive layer 136 that is disposed between the polymer layer 132 and can surface 104. In an alternative example embodiment, tab system 202 includes a second adhesive layer 206 disposed between the polymer layer 132 and second polymer layer 204 to bond them together.

The tab systems 130, 202 of metal-air cells 100, 200 have improved flexibility and have been found to be more effective in preventing premature activation during storage of the metal-air cells 100, 200, and thus provides a longer useful life. The first polymer layer 132 and the second polymer layer 204, can be one of many polymers such that tab systems 130, 202 have a loss stiffness that is about 55,000 N/m or less at room temperature (20° to 25° C.), about 40,000 N/m or less at 45° C. or about 35,000 N/m or less at 60° C. In another embodiment the loss stiffness ranges from about 25,000 N/m to about 45,000 N/m at room temperature (20° to 25° C.). Loss stiffness as a function temperature was tested in the Examples below and a curve comparing the loss stiffness of a conventional tab system to a tab system of the present invention is shown in FIG. 3.

The tab systems 130, 202 can have an oxygen permeability coefficient that allows the metal-air cell 100 to achieve an open circuit voltage (OCV) that ranges from about 1.18 to about 1.37 volts at room temperature (20° to 25° C.), in some embodiments from about 1.25 to about 1.35 volts and in yet in other embodiments from about 1.28 to about 1.32 volts. Tab systems 130, 202 have an oxygen permeability coefficient that can range from about 15 to about 150 $(cm^3 \times m \times mm\ Hg)/(m^2 \times day)$, in some embodiments from about 25 to about 100 $(cm^3 \times m \times mm\ Hg)/(m^2 \times day)$ and in yet other embodiments from about 70 to about 90 $(cm^3 \times m \times mm\ Hg)/(m^2 \times day)$.

It is believed that tab systems 130, 202 better control the amount of oxygen ingress in the metal-air cell 100, 200, respectively, compared to conventional metal-air cells, through improved conformability to the surface 104, for example the bottom, of cathode can 102, through which the air entry port 108 is formed. Surprisingly, the tab systems 130, 202 which have a loss stiffness that ranges from 25,000 N/m to about 45,000 N/m at room temperature were found to have improved burst pressure resistance and improved adhesion to the metal-air cell 100, 200 compared to a conventional tab system, even though the same type and amount of adhesive was used. Tab systems 130, 202 which cover the air entry port 108 of metal-air cells 100, 200 have an average burst pressure of at least about 43 psi. The burst pressure of a conventional tab system and a tab system of an example embodiment of the invention were tested to determine the pressure at which gas generated inside the metal-air cell would cause the tab system to become separated from the cathode can 102. The method of testing and the results are described below in the Examples.

Figure 4:
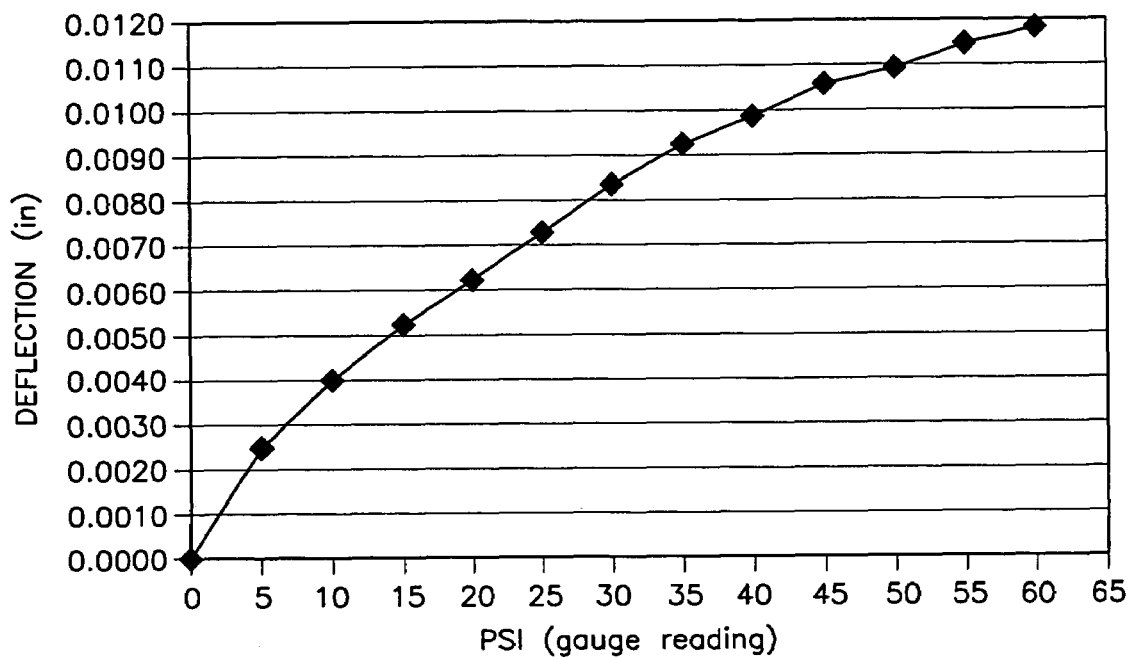
FIG. 4 is a graph of the measured deflection of a tri-clad metal plate used in a metal air cell over a range of pressures according to an embodiment of the invention.

The housings of metal-air cells are being manufactured with thinner components, such as a thinner cathode can 102 of metal-air cell 100, 200 to allow for greater volume of anode mixture 112. For example, the bottom of cathode can 102 having air entry port 108 can be manufactured with a cross-section as thin as about 0.008 inches, and in some cases as thin as about 0.006 inches or thinner, and cathode can thicknesses typically range from about 0.004 inches to about 0.008 inches. Thin cathode can thicknesses result in deformation of the metal-air cells 100, 200 through the buildup of internal pressure generated by gases within the metal-air cells 100, 200 during cell manufacturing and storage. Thus, at least a portion of the surface 104 of the metal-air cell having the air entry port can be curved, and the improved properties of tab system 130, 202 result in greater conformability of tab systems 130, 202 to the metal-air cells 100, 200 when deformed. The deflection of the surface 104 button-type metal-air cells with varying amount of pressure build-up inside the metal-air cell was measured in the Examples below and the results are shown by the curve in FIG. 4. It was noted that the pressure generated inside the metal-air cell 100 caused deformation along the surface 104 of cathode can 102 which caused the position of the air entry port 108 to change along a vertical axis by about 0.012 inches when the internal pressure of the metal-air cell approached 60 psi. Thus, at the burst pressure the deformation of the cathode can causes the tab system to be separated from the metal-air cell, thereby allowing air to flow into and prematurely drain the metal-air cell.

In metal-air cells larger that button cells, such as cylindrical and prismatic cells, air entry ports can be formed in parts of the cell housings that are not flat (for example, the side wall of a cylindrical container) or that may become deformed. The tab systems 130, 202 more effectively control oxygen ingress in these larger cells through improved conformity to surfaces in which air entry ports are formed.

Tab systems 130, 202 include an adhesive 136 (FIGS. 1 and 2) which covers at least a portion of polymer layer 132. The adhesive 136 can be any removable adhesive that allows removal of the tab systems 130, 202 from the metal-air cells 100, 200 without leaving an adhesive residue that is visible without magnification. Preferably there is no visible residue at up to 10× magnification. The adhesive 424 136, can display high initial tack but can also be easily removed, for example, a pressure sensitive removable acrylic adhesive. A suitable acrylic adhesive is available under the trade name FASSON™ R143 from Avery Dennison, FASSON Roll North America, of Painesville, Ohio.

The amount of adhesive 136 can be measured by the weight per unit area coverage of the surface 104 of cathode can 102. The amount of adhesive 136 can range from about 21 $g/m^2$ to about 30 $g/m^2$, and it has been found that the application of additional adhesive 136 beyond a coating weight per unit area of about 30 $g/m^2$ does not compensate for the lack of conformability of conventional tab systems. For example, it has been found that if the coating weight per unit area of adhesive 136 exceeds about 30 $g/m^2$ then the bond between the metal-air cells 100, 200 and tab systems 130, 202, respectively, can exceed the cohesive strength of the adhesive 136 and can leave behind an adhesive residue on the surface 104 of the cathode can 102 and across the air entry port 108.

The contact surface area of adhesive 136 applied to metal-air cell 100, 200 can also vary depending upon the size of the metal-air cell and the number of air entry ports 108 in a cathode can 102. For example, a cathode can 102 having a diameter of about 0.226 inches and a single air entry port 108 having a diameter of about 0.010 inches can have a contact surface area of adhesive 136 that is about 0.0343 $in^2$, and a cathode can 102 having a diameter of about 0.305 inches and a single air entry port 108 having a diameter of about 0.020 inches can have a contact surface area of about 0.0622 $in^2$. In a metal-air cell 100, 200 that has four air entry ports, for example, a cathode can 102 having diameter of about 0.454 inches and having four air entry ports of about 0.014 inches in diameter can have a contact surface area of adhesive 136 that is about 0.1301 square inches.

The second adhesive layer 206 (FIG. 2), which in alternative embodiments is used between first polymer layer 132 and second polymer layer 204, can be a permanent adhesive, such as a permanent acrylic adhesive, for example. The contact surface area of the adhesive between polymer layer 132 and second polymer layer 204 can vary depending on the type of adhesive that is used. In alternative embodiments, polymer layer 132 and second polymer layer 204 are bonded directly to each other, for example via a heat process, without the use of a second adhesive layer 206.

The peel strength of tab systems 130, 202 along the surface of metal-air cells 100, 200 of the present invention can range from about 6.5 $lbs/in^2$ to about 11.0 $lbs/in^2$, and in some embodiments from about 7.0 $lbs/in^2$ about 10.0 $lbs/in^2$, over a temperature range of 23° C. to 60° C. and a cure period of up to about 4 weeks, based on ASTM D 903-93 test method. A peel test comparing example embodiments of the tab system of the present invention and conventional tab systems was conducted, and a description of the test method along with the resulting data are described in the Examples below. Thus, tab systems 130, 202 provide better peel strength and pressure resistance along the surface of the cathode can 102 through which the air entry port 108 is formed, to maintain a seal until the metal-air cell 100 is ready for use.

Metal-air cells 100, 200 (FIGS. 1 and 2) may include mercury in the anode mixture 112, for example in the zinc powder, in order to reduce gassing inside the cell. However, because mercury can be hazardous to health and to the environment, approaches have been taken to produce metal-air cells with no added mercury. Therefore, in another embodiment of the present invention the metal-air cells 100, 200 contain no mercury or substantially no mercury. Metal-air cells having no mercury or substantially no mercury include metal-air cells which are made with zero added mercury. Zero added mercury means no mercury is intentionally added to materials used in the cell, and any mercury contained in the cells is present only in very small amounts as impurities. For example, the amount of mercury present in a metal-air cell in which the active material includes zinc is less that 10 parts per million by total weight of the cell, and in some cases less than 1 part per million, as determined by the test method disclosed in U.S. Pat. No. 6,602,629 B1 referenced above. In one example embodiment of a cell containing zero added mercury, the zinc powder has no mercury added to it, and the interior of the anode cup 110 is free of indium and all other metals having an hydrogen over-voltage higher than copper, at least at the portion of the anode cup 110 contacting the electrical insulator 126. In such case the amount of deformation of cathode can 102, as well as the pressure exerted on tab systems 130, 202 can be significantly higher than in metal-air cells that contain mercury, because the amount of internal gassing is generally greater when the cell contains zero mercury or substantially no mercury.

The thickness of tab system 130, and the combined thickness of the first and second polymer layers 132, 204 of tab system 202, having the loss stiffness properties described above, can range from about 0.003 inches to about 0.006 inches, excluding adhesive layer 136, in alternative embodiments from about 0.0038 inches to about 0.005 inches, and yet in other embodiments from about 0.004 inches to about 0.0046 inches. The range of thickness can vary depending upon the loss stiffness of the tab system 130, 202 within the prescribed range, and can easily be determined by one of ordinary skill of the art. The relative thicknesses of the first polymer layer 132 and the second polymer layer 204 (FIG. 2) can depend upon the material compositions and loss stiffness of the first and second polymer layers 132 and 204 and can be determined by one of ordinary skill in the art. No additional thickness of the polymer layer(s) is needed.

In another embodiment the material compositions of first polymer layer 132 and second polymer layer 204 include a polymer that is crystalline or semi-crystalline. The first polymer layer 132 or the second polymer layer 204, or both, can be biaxially oriented. The term "biaxially oriented" refers to the relative crystallinity of a polymer in perpendicular directions which can be determined on a relative basis by the measurement of the tensile stress of a polymer film in the machines direction (MD) and the transverse direction (TD). As used herein, a biaxially oriented film is one having a MD:TD tensile stress ratio that ranges from about 1:3 to about 3:1. The material compositions of first polymer layer 132 and second polymer layer 204 can also include up to about 15% fillers, for example, talc, calcium carbonate, minerals.

In another embodiment of the invention, the first polymer layer 132 and the second polymer layer 204 of tab systems 130, 202 are material compositions that comprise polypropylene. The polypropylene can be biaxially oriented. Examples of suitable biaxially oriented polypropylene that can be used for first polymer layer 132 and second polymer layer 204, each having a layer of adhesive, are FASSON® 3 mil matte white BOPP TC/R143/50# SCK available from Avery, Dennison, Fasson Roll North America, Painesville, Ohio, and #1240 self-wound polypropylene available from International Graphic Films, Hudson, Ohio, respectively.

In an embodiment of the invention the method of making the metal-air cells 100, 200 having tab systems 130, 202, respectively, includes inverting the anode cup 110 and then adding anode mixture 112 and an electrolyte. After the anode cup 110 is preassembled with the anode cup 110 inverted, the cathode can 102 described above with reference to FIGS. 1 and 2 is inverted and pressed against the anode cup 110 and electrical insulator 126. While inverted the edge the cathode can 102 is deformed inwardly so the rim of the cathode can 102 is compressed against the electrical insulator 126, which is between the cathode can 102 and the anode cup 110, thereby forming a seal and electrical barrier between the anode cup and the cathode can. Any suitable method may be used to seal the metal-air cell 100 such as, for example, deforming the cathode can 102 by crimping, colleting, swaging, redrawing and combinations thereof.

Tab systems 130, 202 can be made by laminating the polymer layer 132 to the outer polymer layer 134 under heat and coating the underside of the end portion of the sealant member with an adhesive 136, for example, a releasable pressure sensitive acrylic adhesive, prior to adhering the tab system to the cathode can 102. In another method, the polymer layer 132 and the second polymer layer 204 can each be a tape with adhesive pre-applied, with sheets or strips of polymer layers 132 and 204 adhered together before the individual tabs are cut. A release liner applied to the inner surface of adhesive layer 136 can remain in place until just before the cut tab systems 150, 202 are applied to the metal-air cell 100, 200. Once the release liner is removed an end portion of tab systems 230, 202 are applied to the surface 104 of metal-air cells 100, 200 by pressing at least a portion of adhesive layer 136 against the surface 104 of the cathode can 102. The metal-air cells 100, 200 with the tab systems 130, 202 affixed thereto are then packaged for sale.

EXAMPLE 1

Several specimens of a conventional tab system and specimens of a tab system according to an example embodiment of the invention were prepared. Each of the tab system specimens were made by adhering a first tape having a first polymer layer and a first adhesive layer, to a second tape having a second polymer layer and a second adhesive layer. In all tab systems the first polymer layer, the first adhesive layer and the second adhesive layer were the same; only the first polymer layer differed.

The adhesive coated polymer tape materials used for the first polymer layer and the first adhesive layer of a conventional tab system was available as FASSON® PRIMAX 350® 350/R143/50#SCK from Avery Dennison, Fasson Roll North America, Painesville, Ohio, and had a polymer layer approximately 0.0035 inches thick made from a co-extrusion of equal thicknesses of polyethylene and polypropylene (typical tensile stress 160,000 psi in the machine direction and 50,000 psi in the transverse direction). The polymer layer was coated with a layer of approximately 27 g/m$^2$ of FASSON® R143 removable acrylic adhesive.

The adhesive coated polymer tape used for the first polymer layer and the first adhesive layer in a tab system of an example embodiment of the invention was available as FASSON® 3 Mil Matte White BOPP TC/R143/50#SCK from Avery Dennison, Fasson Roll North America, Painesville, Ohio, and had a polymer layer approximately 0.003 inches thick made from biaxially oriented polypropylene (typical tensile stress 13,000 psi in the machine direction and 23,000 psi in the transverse direction).

The adhesive coated polymer tape used for the second polymer layer and the second adhesive layer in both the conventional tab systems and the tab system of an example embodiment of the invention was available as product No. 1240 self-wound polypropylene from International Graphic Films, Hudson, Ohio, and had a layer of biaxially oriented polypropylene film about 0.008 inches thick coated on one surface with approximately 27 g/m$^2$ of permanent acrylic adhesive.

For each tab system, a sheet of the first tape was adhered to the uncoated surface of the second tape. Specimens were cut from of each of the tab system materials for the tests in Examples 2-5 below.

EXAMPLE 2

Specimens were cut from each of the tab systems from Example 1 for burst pressure testing. Each of the specimens was 0.386 inches long and 0.210 inches wide, with a 0.105 inch radius on each of the two long ends.

On the burst pressure test, a tab system specimen was adhered, or sealed, to the surface of a test disc simulating the bottom surface of a button cell cathode can containing an air entry port, and pressure was applied from the opposite side of the disc, through an orifice in the disc, to the specimen sealed over the orifice. The pressure was increased until the seal was broken, and the burst pressure of each specimen was the peak pressure measured before the seal was broken.

A test disc was made of triclad 201 Nickel/304 Stainless Steel/201 Nickel, available from Engineered Material Solutions Corporation, and having a thickness of 0.0060 inches and a diameter of approximately 0.750 inches with a centered 0.0020 inches diameter orifice. The disc was cleaned with isopropyl alcohol before testing each specimen. A specimen was centered over the hole and sealed to the disc with the adhesive coating on the inner surface of the specimen, and the disc was centered over an o-ring on the bottom of an air chamber fixture apparatus. An air supply was connected to the air chamber with an air line. A Model No. 30242 air pressure regulator from Fairchild Corporation of Winston-Salem, N.C., and a Model No. AMC4297 analog pressure gauge with a peak pressure indicator having a range of 0-60 psi and resolution of 0.5 psi from Ashcroft Gauge Corporation of Strafford, Conn., were installed downstream of the air supply to record the peak pressure achieved prior to air leakage due to adhesive failure between the specimen and the disc.

The peak pressure indicator was set to 0, and then the pressure was slowly increased at a rate of approximately 15 psi per 60 seconds. The air could not escape through the triclad disc until the pressure in the air chamber reached a pressure greater than the adhesive force of the specimen. As soon as air began to leak from between the specimen and the disc, the peak pressure was read from the indicator and recorded. The test procedure was repeated for a total of ten specimens of each tab system.

During the tests the disc deflected vertically due to the pressure within the air chamber. The amount of vertical deflection was measured at pressures up to 60 psi. The results are shown in the graph in FIG. 4.

The average burst pressure for the ten specimens of the conventional tab system was 39.4 psi, and the average burst pressure for the ten specimens of the tab system of the invention was 47.4 psi.

EXAMPLE 3

Tab system specimens were cut from each of the materials as described in Example 2 for peel tests to measure the force required to remove tab systems from cells. Prior testing had shown that the test results are essentially independent of designs embossed on the bottom surfaces of button cell cans having an air entry port; Eveready No. AC-10 (PR-70 type) Zn/air button cells (outside can diameter approximately 0.226 inches) were used. Specimens were centered on and adhered, or sealed, to the bottoms of cells in preparation for testing. Twenty cells sealed with each tab system were stored at room temperature (20° C. to 25° C.) and 50% relative humidity, and twenty cells sealed with each tab system were stored at 60° C. After a designated storage time, the specimens were tested for peel strength. Those cells stored at 60° C. were cooled to room temperature before testing, and the testing was done at 20° C. to 25° C. and 50% relative humidity.

The peel tests were conducted according to ASTM method D 903-93 "Standard Test Method for Peel or Stripping Strength of Adhesive Bonds," modified to accommodate the small size of the specimens. A fixture was made to firmly attach a cell to the base of a motorized stand. For each specimen tested, the cell was placed in the fixture and the tab system specimen was placed in a tensile testing machine (Chatillon TCM-201 tension/compression tester, equipped with a Chatillon DFA series force gauge, from C.S.C Force Measurement, Inc. of Agamam, Mass.) mounted on the stand. The tensile testing machine was raised with the motorized stand at a uniform rate of 6 inches per minute so that the free end of the tab system was folded over and pulled across the bottom of the cell (parallel to the bottom surface of the can) until the tab was completely separated from the cell. The peak tension required to pull the tab was measured with the gauge.

The results of the peel tests are shown in Table 1 below.

TABLE 1

| | Tab System: | | | |
|---|---|---|---|---|
| | Invention | Conventional | Invention | Conventional |
| Time/ Temp.: | 4 wks./RT | 4 wks./RT | 4 wks./60° C. | 4 wks./60° C. |
| Ave. Peel Strength: | 6.29 lbs/in$^2$ | 13.00 lbs/in$^2$ | 9.93 lbs/in$^2$ | 16.12 lbs/in$^2$ |

EXAMPLE 4

Specimens were cut from each of the two tab system materials in Example 1 to determine their oxygen permeability. Comparative specimens were also cut from the adhesive coated inner film layer material used to make the conventional tab system material and the adhesive coated outer film layer material used to make both tab system materials in Example 1. The size of each specimen was at least 2.5 inches by 2.5 inches.

Three specimens of each type were tested, each according to the following method:

A cold-rolled steel test plate having a centrally located 2 inch diameter orifice was cleaned with acetone and water. The specimen was positioned over the orifice and adhered to the test plate so that the specimen extended at least about 0.25 inches beyond the edge of the orifice. The specimen further adhered to the test plate with a thin coating of epoxy applied to the orifice wall to keep the specimen from pulling away from the surface of the test plate during testing. (This can also be accomplished by other means, such as by applying epoxy to the surface of the test plate to which the specimen is adhered or by clamping the specimen between two aligned test plates.) On one side of the metal plate a stream of 100% hydrogen gas flowed across the specimen, and on the opposite side of the plate a stream of air containing 20.8% oxygen flowed across the specimen, each at a flow rate of 20 cm$^3$/minute. The amount of oxygen that permeated across through the specimen to the hydrogen gas side was measured by a thermal conductivity detector (MOCON® OX-TRAN® instrument from Mocon, Inc. of Minneapolis, Minn.).

The measurements were converted to a permeability coefficient for 100% oxygen, and the results are shown in Table 2 below.

TABLE 2

| Specimen Material | Permeability Coefficient ($cm^3 \times m \times mm\ Hg$)/($m^2 \times day$) |
|---|---|
| Conventional tab system | 52.061 |
| Tab system of the invention | 84.226 |
| First polymer layer and first adhesive layer of conventional tab system | 92.013 |
| Second polymer layer and second adhesive of both tab systems | 22.866 |

While the oxygen permeability was determined using a test plate with a 2 inch diameter orifice, it is possible to modify the test plate by reducing the size of the orifice in order to test smaller specimens of tab systems, as long as the specimens remain affixed to the test plate throughout the test, though longer testing times may be desirable.

EXAMPLE 5

Specimens were cut from each of the two tab system materials for Dynamic Mechanical Analysis (DMA) to determine the loss stiffness and storage modulus of each tab system material. Each specimen was 2 mm wide and 5.7 mm long.

Figure 5:
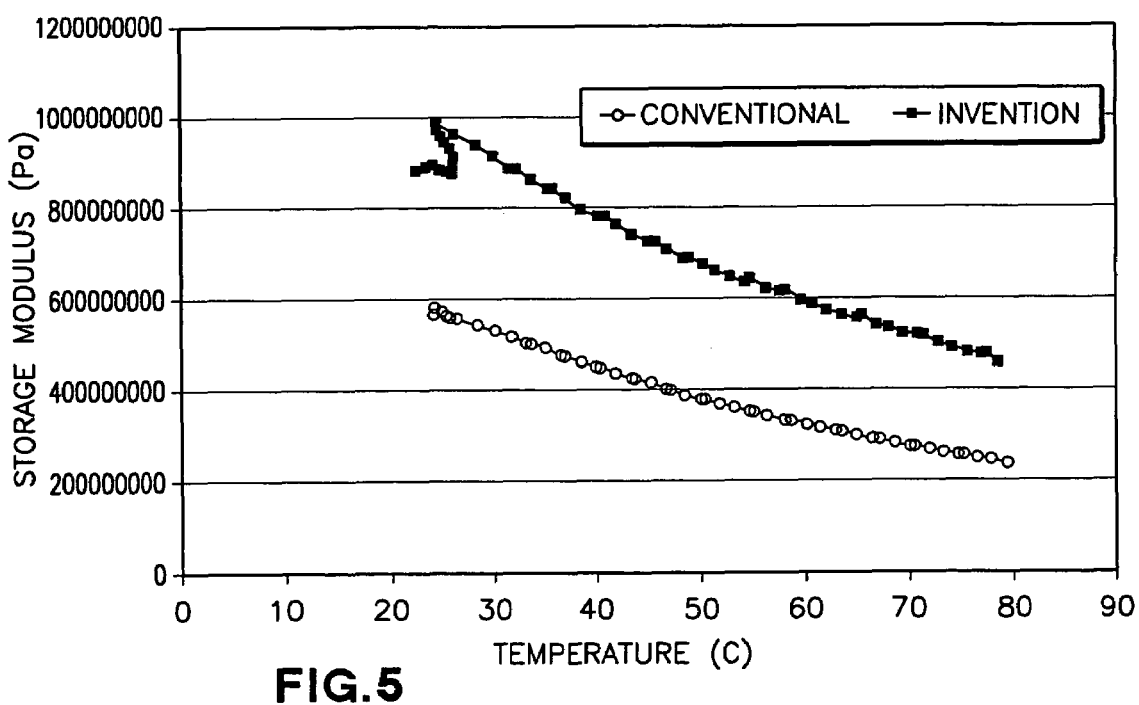
FIG. 5 is a graph comparing the storage modulus of the tab system of FIG. 2 over a range of temperatures according to an embodiment of the invention.

DMA testing was conducted according to ASTM D4065-01 over a temperature range of 25° C. to 80° C. Each specimen was placed in a Dynamic Mechanical Analyzer (TRITEC Model No. 2000 from Triton Technologies LTD of Mansfield, UK). The specimen was placed between two steel clamps, one clamp connecting one end of the specimen to a sinusoidal driving device that input a tension force at a rate of one hertz and the other clamp connecting the opposite end of the specimen to a force transducer that measured the corresponding tension while the temperature was increased at a rate of 2° C./minute. The data collected in real-time mode allowed calculation of the loss stiffness (plotted as a function of temperature in the graph of FIG. 3) and the storage modulus (plotted as a function of temperature in the graph of FIG. 5).

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A metal-air cell comprising:
    at least one air entry port along an exterior surface of the cell; and
    a tab system that covers the at least one air entry port, the tab system comprising at least a first polymer layer, a second polymer layer, a first adhesive layer disposed between the exterior surface of the metal air cell and the first polymer layer, and a second adhesive layer between the first polymer layer and the second polymer layer, wherein:
    the first polymer layer and the second polymer layer are both biaxially oriented;
    the tab system has a loss stiffness that is from about 25,000 N/m to less than about 55,000 N/m at 20° C. to 25° C.;
    the tab system has an oxygen permeability of from about 50 ($cm^3 \times m \times mm\ Hg$)/($m^2 \times day$) to about 150 ($cm^3 \times m \times mm\ Hg$)/($m^2 \times day$); and
    the cell comprises zero added mercury.

2. The metal-air cell of claim 1 wherein the tab system has a peel strength that ranges from about 6.5 psi to about 11 psi.

3. The metal-air cell of claim 1 wherein the external surface of the cell having at least one air entry port comprises a curved surface.

4. The metal-air cell of claim 1 wherein the tab system has a loss stiffness that ranges from about 25,000 N/m to about 45,000 N/m at 20° C. to 25° C. and is less than about 35,000 N/m at 60° C.

5. The metal-air cell of claim 1 wherein the cell comprises an active material that comprises zinc and an electrolyte that comprises potassium hydroxide.

6. The metal-air cell of claim 5 wherein the cell has an open circuit voltage that ranges from about 1.18 volts to about 1.37 volts.

7. The metal-air cell of claim 1 wherein the cell is generally cylindrical in shape.

8. The metal-air cell of claim 7 wherein the cell is a button-type cell.

9. The metal-air cell of claim 1 wherein the cell is generally prismatic in shape.

10. The metal-air cell of claim 1 wherein the first polymer layer comprises polypropylene.

11. The metal-air cell of claim 10 wherein the first polymer layer is biaxially oriented such that a ratio of tensile stress in a machine direction to tensile stress in a transverse direction ranges from about 1:3 to about 3:1.

12. The metal-air cell of claim 10 wherein a thickness of the first polymer layer ranges from about 0.003 inches to about 0.005 inches.

13. The metal-air cell of claim 10 wherein the first adhesive layer is removable from the cell with no visible residue remaining on the cell.

14. The metal-air cell of claim 13 wherein the first adhesive layer comprises an acrylic adhesive.

15. The metal-air cell of claim 1 wherein the second polymer layer comprises polypropylene.

16. The metal-air cell of claim 1 wherein both the first polymer layer and the second polymer layer comprise polypropylene.

17. The metal-air cell of claim 16 wherein the second adhesive comprises an acrylic adhesive.

18. The metal-air cell of claim 1 wherein the second adhesive comprises an acrylic adhesive.

19. The metal-air cell of claim 15 wherein the second polymer layer is biaxially oriented such that a ratio of tensile stress in a machine direction to tensile stress in a transverse direction ranges from about 1:3 to about 3:1.

20. A metal-air cell comprising:
    at least one air entry port along an exterior surface of the cell;
    a tab system that covers the at least one air entry port, the tab system comprising:
    a first polymer layer;
    a second polymer layer;
    a first adhesive layer disposed between the external surface of the cell and the first polymer layer;
    a second adhesive layer between the first polymer layer and the second polymer layer; wherein
    the first polymer layer and the second polymer layer are both biaxially oriented;
    the tab system has a loss stiffness that is from about 25,000 N/m to less than about 55,000 N/m at 20° C. to 25° C.
    the tab system has an average burst pressure of from about 43 psi to 60 psi;
    the tab system has an oxygen permeability of from about 50 ($cm^3 \times m \times mm\ Hg$)/($m^2 \times day$) to about 150 ($cm^3 \times m \times mm\ Hg$)/($m^2 \times day$); and
    the cell comprises zero added mercury.

21. The metal-air cell of claim 20 wherein the external surface of the cell having at least one air entry port comprises a curved surface.

22. The metal-air cell of claim 20 wherein the tab system has a loss stiffness that ranges from about 25,000 N/m to about 45,000 N/m at 20° C. to 25° C. and is less than about 35,000 N/m at 60° C.

23. The metal-air cell of claim 20 wherein both the first polymer layer and the second polymer layer comprise polypropylene.

24. The metal-air cell of claim 23 wherein both the second adhesive comprises an acrylic adhesive.

25. A metal-air cell comprising:
- at least one air entry port along an exterior surface of the cell; and
- a tab system that covers the at least one air entry port, the tab system comprising:
  - a first polymer layer;
  - a second polymer layer:
  - a first adhesive layer disposed between the surface of the metal air cell and the first polymer layer; and
  - a second adhesive layer between the first polymer layer and the second polymer layer; wherein:
  - the first polymer layer and the second polymer layer are both biaxially oriented;
  - the tab system has a loss stiffness that is from about 25,000 N/m to less than about 55,000 N/m at 20° C. to 25° C., an average burst pressure of from about 43 psi to 60 psi, a peel strength that ranges from about 6.5 psi to about 11 psi and an oxygen permeability of from about 50 $(cm^3 \times m \times mm\ Hg)/(m^2 \times day)$ to about 150 $(cm^3 \times m \times mm\ Hg)/(m^2 \times day)$; and
  - the cell comprises zero added mercury.

26. The metal-air cell of claim 25 wherein the external surface of the cell having at least one air entry port comprises a curved surface.

27. The metal-air cell of claim 25 wherein the tab system has a loss stiffness that ranges from about 25,000 N/m to about 45,000 N/m at 20° C. to 25° C. and is less than about 35,000 N/m at 60° C.

28. The metal-air cell of claim 25 wherein the first polymer layer comprises polypropylene and is biaxially oriented such that a ratio of tensile stress in a machine direction to tensile stress in a transverse direction ranges from about 1:3 to about 3:1.

29. The metal-air cell of claim 28 wherein the second polymer layer comprises polypropylene and is biaxially oriented such that a ratio of tensile stress in a machine direction to tensile stress in a transverse direction ranges from about 1:3 to about 3:1.

30. A metal-air cell comprising:
- at least one air entry port along an exterior surface of the cell;
- a tab system that covers the at least one air entry port, the tab system comprising:
  - a first polymer layer;
  - a second polymer layer;
  - a first adhesive layer disposed between the external surface of the metal air cell and the first polymer layer; and
  - a second adhesive layer between the first polymer layer and the second polymer layer; wherein:
  - the first polymer layer and the second polymer layer are both biaxially oriented;
  - the tab system has a loss stiffness that is from about 25,000 N/m to less than about 55,000 N/m at 20° C. to 25° C., an average burst pressure of from about 43 psi to 60 psi, a peel strength that ranges from about 6.5 psi to about 11 psi, and an oxygen permeability of from about 50 $(cm^3 \times m \times mm\ Hg)/(m^2 \times day)$;
  - the cell comprises an active material which comprises zinc and an electrolyte that comprises potassium hydroxide and has an open circuit voltage that ranges from about 1.18 volts to about 1.37 volts; and
  - the cell comprises zero added mercury.

31. The metal-air cell of claim 30 wherein the tab system has a loss stiffness that ranges from about 25,000 N/m to about 45,000 N/m at 20° C. to 25° C. and is less than about 35,000 N/m at 60° C.

32. The metal-air cell of claim 30 wherein the first polymer layer and the second polymer layer are both biaxially oriented such that a ratio of tensile stress in a machine direction to tensile stress in a transverse direction ranges from about 1:3 to about 3:1.

* * * * *